(12) United States Patent
Soatti et al.

(10) Patent No.: US 10,940,839 B2
(45) Date of Patent: Mar. 9, 2021

(54) MOTORBIKE WITH A PHONIC WHEEL SENSOR SUPPORTING STRUCTURE

(71) Applicant: PIAGGIO & C. S.P.A, Pontedera (IT)

(72) Inventors: Piero Soatti, Pontedera (IT);
Alessandro Bonora, Pontedera (IT);
Roberto Calo', Pontedera (IT)

(73) Assignee: PIAGGIO & C. S.P.A, Pontedera (IT)

( * ) Notice: Subject to any disclaimer, the term of this patent is extended or adjusted under 35 U.S.C. 154(b) by 129 days.

(21) Appl. No.: 16/347,326

(22) PCT Filed: Nov. 3, 2017

(86) PCT No.: PCT/IB2017/056872
§ 371 (c)(1),
(2) Date: May 3, 2019

(87) PCT Pub. No.: WO2018/083644
PCT Pub. Date: May 11, 2018

(65) Prior Publication Data
US 2019/0329747 A1  Oct. 31, 2019

(30) Foreign Application Priority Data
Nov. 4, 2016  (IT) .................. 102016000111385

(51) Int. Cl.
*B60T 8/32* (2006.01)
*B62L 1/00* (2006.01)
(Continued)

(52) U.S. Cl.
CPC .............. *B60T 8/329* (2013.01); *B62L 1/005* (2013.01); *B62J 45/40* (2020.02); *B62K 25/08* (2013.01);
(Continued)

(58) Field of Classification Search
CPC ........... B60T 8/329; B62L 1/005; B62J 45/40; B62K 25/08; F16D 2055/0012; F16D 2066/003
See application file for complete search history.

(56) References Cited

U.S. PATENT DOCUMENTS

| 7,901,013 B2 | 3/2011 | Ishida | |
| 2018/0043959 A1* | 2/2018 | Yasuhara | ................. B62L 1/00 |
| 2018/0117961 A1* | 5/2018 | Ono | ....................... B62K 19/38 |

FOREIGN PATENT DOCUMENTS

| IE | 10 2007 053339 A1 | 5/2008 |
| JP | 2002 079 974 A | 3/2002 |

(Continued)

*Primary Examiner* — Thomas Truong
(74) *Attorney, Agent, or Firm* — McGlew and Tuttle, P.C.

(57) ABSTRACT

A motorbike including an assistant system to a braking system, of the type comprising a phonic wheel, a phonic wheel speed sensor (200), and a related cable (201) for the transmission of a signal of said speed sensor (200), a supporting structure, for supporting the phonic wheel speed sensor (200) and a brake caliper (300), comprises: a main body (1) fastened or which can be fastened to a stem of a fork (F) of a motorbike; a wheel support (2) connected to said main body (1) for supporting a wheel of the motorbike; an extension (3) which develops from said main body (1) and comprises a fastening device (30) for a brake caliper (300), wherein said extension (3) comprises a pair of ribs (33, 34) defining opposite edges thereof, a reinforcing plate (35) extending between said pair of ribs (33, 34), said ribs (33, 34) forming thickenings of the extension (3) with respect to said reinforcing plate (35), and a pass-through opening (31) for housing the phonic wheel sensor (200) and defined in said reinforcing plate (35) in an intermediate position between said ribs (33, 34); and a cable fastening device (4) fastened to an upper portion of said brake caliper (300).

11 Claims, 4 Drawing Sheets

(51) Int. Cl.
  *B62K 25/08* (2006.01)
  *F16D 55/00* (2006.01)
  *F16D 66/00* (2006.01)
  *B62J 45/40* (2020.01)
(52) U.S. Cl.
  CPC ............... *F16D 2055/0012* (2013.01); *F16D 2066/003* (2013.01)

(56) References Cited

FOREIGN PATENT DOCUMENTS

| | | |
|---|---|---|
| JP | 2007 078 549 A | 3/2007 |
| WO | 2016/157439 A1 | 10/2016 |

\* cited by examiner

MOTORBIKE WITH A PHONIC WHEEL SENSOR SUPPORTING STRUCTURE

The present invention is referred to a motorbike with a supporting structure for a phonic wheel sensor and a brake caliper, of the type comprising a main body which can be fastened to a fork stem, a wheel support and an extension for fastening a brake caliper.

In motorbikes equipped with ABS systems which, as it is known, include the use of a wheel and a relative sensor, various solutions are used to support the sensor in a position suitable for detecting the wheel speed.

One of the possible solutions is to connect the speed sensor holder to the brake caliper bracket.

For instance, U.S. Pat. No. 7,901,013A describes a caliper support which bifurcates into an upper arm portion and a portion of the lower arm. On the portion of the lower arm an assembling area is formed, to assembly the wheel speed sensor. Another solution of this kind is described in Japanese Patent Application No. JP2007/078,549A.

More precisely, the support of the caliper externally has an inner rib on which a surface is defined, wherein the assembling area is defined, connected to the support of the phonic wheel speed sensor.

Such a solution and, more generally, other known solutions are not optimal in terms of structural robustness.

In particular, the supporting structures of phonic wheel sensors may be subject to strikes caused by moving objects during the running of the vehicle, and they may also suffer accidental bumps during the maintenance operations of the bike, e.g. when the bike is mounted on a stand, e.g. for the replacement of the front wheel.

In addition to this robustness concern, it is also required that the supporting structure does not involve complex machining for the manufacturing thereof. Many solutions in fact require that the sensor supporting structure be integrally formed with the stem of the fork and this may lead to difficulties in the realization of the component, typically made by molding.

A further solution for fastening the speed wheel sensor is represented by the use of a special support, connected to the wheel axis. An example of such a solution is described in Japanese Patent Application JP2002/079,974A.

This document describes a wheel drive sensor mounted on an arm extending from a coaxial collar of the wheel axis.

Although this solution allows a simple realization of the components, it does not achieve a sufficiently stable positioning and the speed sensor for the phonic wheel neither a suitable protection thereof.

Therefore, in general terms, the known solutions are not able to ensure a sufficient robustness, lightness, ease of processing and ease of assembly for the phonic wheel sensor.

The technical problem underlying the present invention is to provide a motorbike with a phonic wheel sensor supporting structure inherently and functionally conceived to overcome one or more of the limitations described above with reference to the cited prior art.

Within the aforesaid problem, a main object of the invention is to develop a wheel sensor for a phonic wheel supporting structure allowing a suitable protection against strikes, whereby reducing the risk of shocks and accidental breakage, both in running and during the maintenance operations.

A further object is to provide a motorbike with a supporting structure for a phonic wheel sensor ensuring a high reliability of the sensor.

Still, a further object is to provide a motorbike with a supporting structure for a phonic wheel sensor involving a simple manufacturing a and not requiring a complex machining.

Another object of the present invention is to allow an easy and precise assembling of the wheel sensor.

This problem is solved and these objects are met by the present invention through a motorbike with a supporting structure for a phonic wheel sensor and a brake caliper realized in accordance with claim 1.

Preferred features of the invention are defined in the dependent claims.

The motorbike with a supporting structure according to the present invention allows to obtain a high level of the phonic wheel sensor protection both during the running and when the vehicle is placed on a stand for maintenance operations.

Moreover, said structure can be realized through a simple molding processing, without therefore requiring a complex mechanical machining.

In addition, the structure of the present invention allows to support the phonic wheel sensor in a precise position, allowing at the same time a simple assembling of the same.

According to preferred aspects thereof, the invention also allows to provide high robustness and stiffness for supporting the brake caliper, albeit with reduced weights and overall size.

According to other aspects, the invention also allows to support the brake caliper in a simple way and without the need for additional components.

The characteristics and advantages of the invention will become clearer from the detailed description of two embodiments, described only by non-limiting example, with reference to the annexed drawings wherein.

Figure 1:
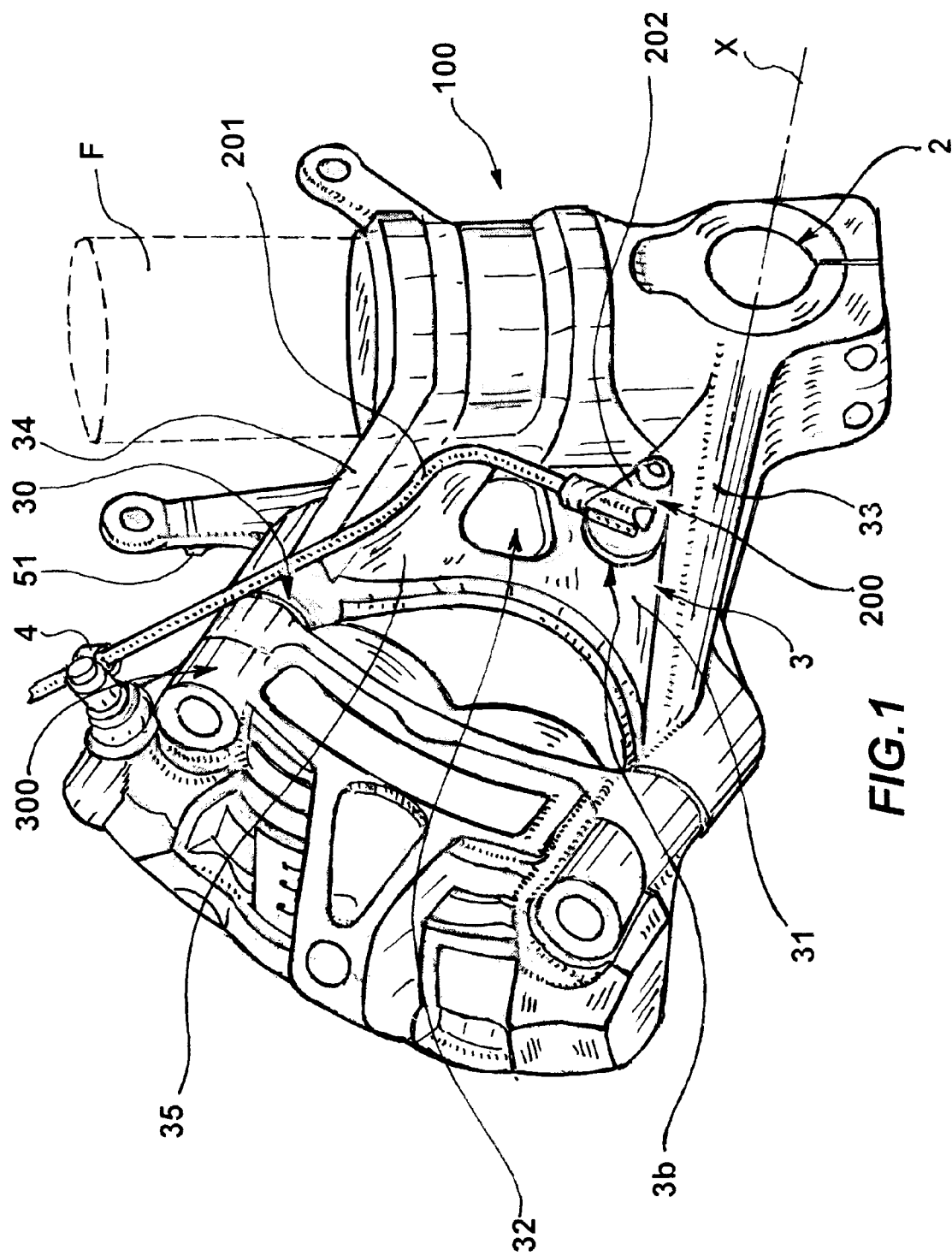
FIG. 1 is a side view from an outer side of the supporting structure according to the present invention.

With reference first to FIG. 1, with the reference number 100 is indicated as a whole a supporting structure for a phonic wheel sensor 200 and a brake caliper 300 formed in accordance with the present invention.

According to a preferred embodiment, the supporting structure 100 defines a so-called fork stem, namely the part of the terminal fork on which the wheel axle of the vehicle can be fastened.

In this case, the supporting structure can be fastened to a fork stem F, schematically shown in FIG. 1, and is preferably shaped in such a way that the part of the stem terminal can be housed in an appropriate seat.

It is, however, apparent that the supporting structure may be more generally fastened to the fork stem, possibly made in one integral piece with the same.

It must also be noted that the structure according to the present invention is normally intended for use in motorbikes, preferably having one or two front wheels, equipped with a brake assistance system, such as an ABS system. In a preferred embodiment, the structure according to the present invention finds application in the front wheel or wheels to support the front wheel axis, the brake caliper of the braking system serviced by the assistance system and the sensor of the phonic wheel used in the ABS system.

Figure 3:
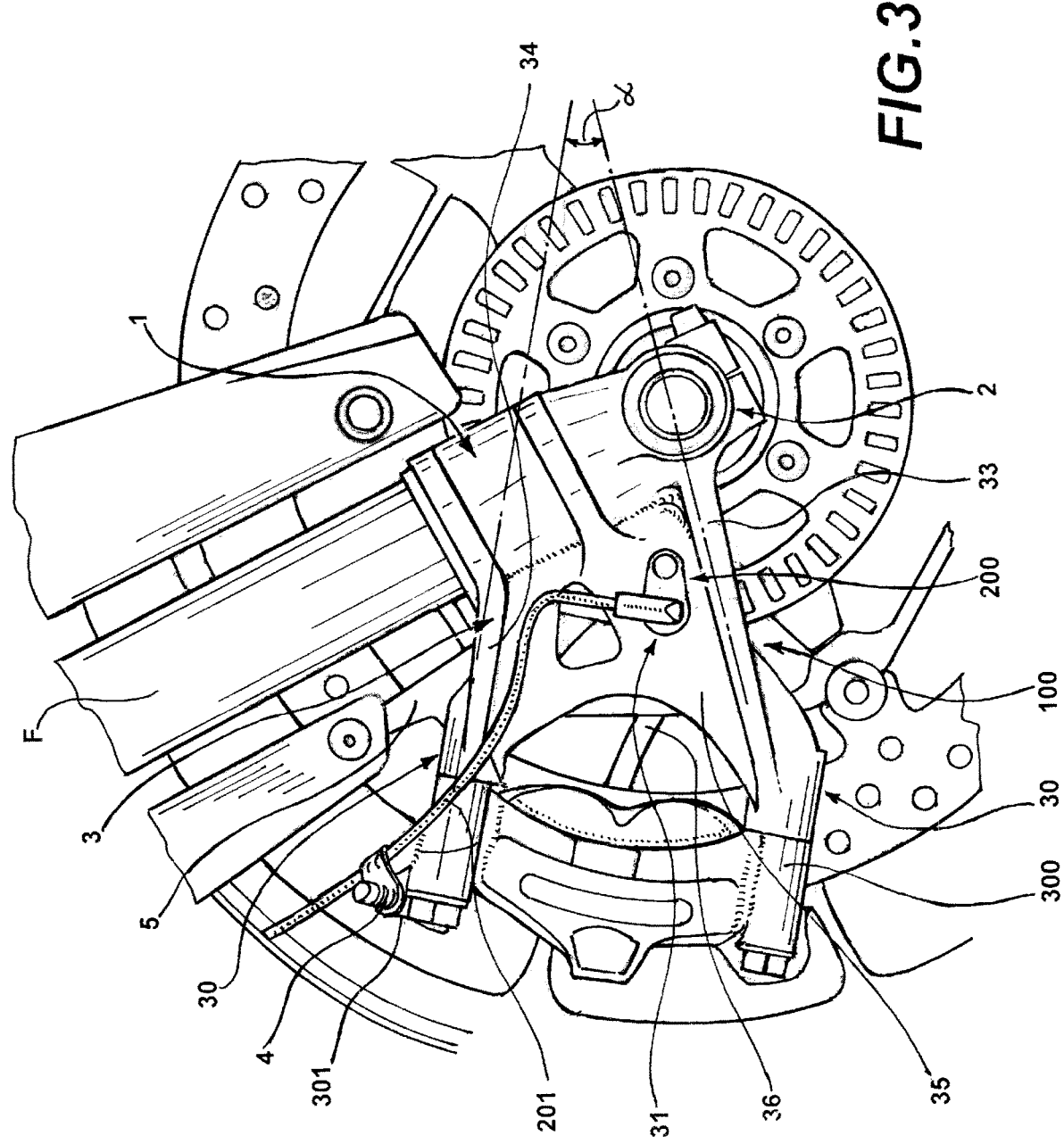
FIG. 3 is a side view of the supporting structure of FIG. 1 assembled on the fork of a motorbike.
Figure 4:
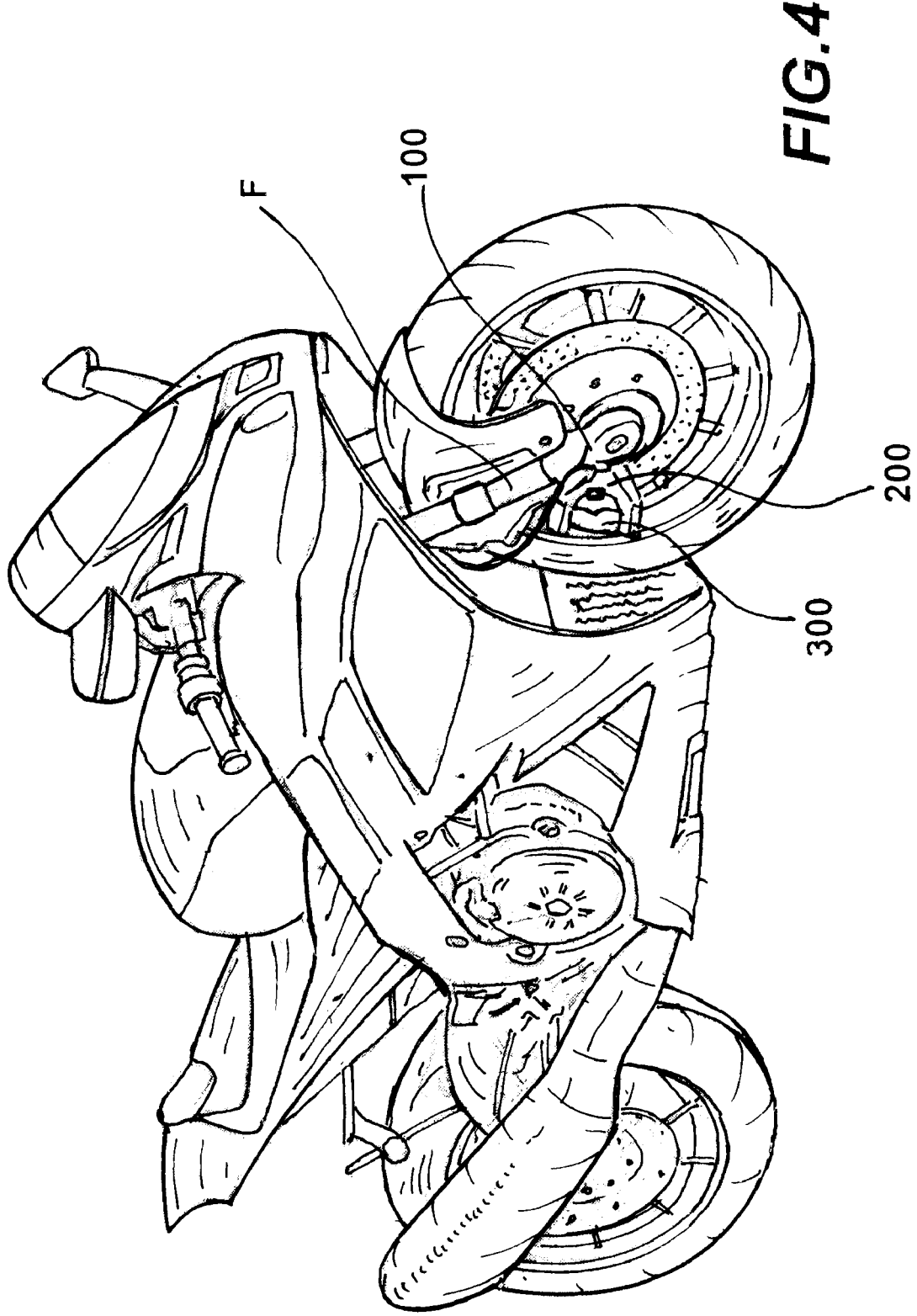
FIG. 4 is a schematic illustration of a motorbike comprising the supporting structure of the present invention.

With reference to FIGS. 1 and 3, the structure 100 according to the present invention comprises a main body 1, intended for being fastened to the fork stem F, to which a wheel support 2 is connected, the support of the vehicle wheel occurs according to known modalities. In one embodiment, the wheel support 2 is shaped in such a way as to define a cylindrical housing which develops according to the 'axis of rotation X of the motorbike wheel.

From the main body 1 an extension 3 projects to support the brake caliper 300 and for the assembling thereof.

In a preferred embodiment, the main body 1, the wheel support 2 and the extension 3 are formed in an integral piece.

Preferably, the extension 3 comprises a fastening device 30 of the brake caliper 300 that, in a preferred embodiment, includes threaded members, not shown in the figure. By way of example, the brake caliper 300 may comprise two cylindrical seats wherein screws are inserted to engage respective threaded seats defining said threaded members.

According to a preferred embodiment, the extension 3 comprises a pair of ribs 33, 34. Preferably, the extension 3 comprises a lower rib 33 arranged, in use, towards a support surface of the vehicle, and an upper rib 34, opposite to the preceding one. In other words, the ribs 33, 34 define opposite edges of the extension 3 and surround the extension in the transverse direction.

In one embodiment, ribs 33, 34 are mutually divergent in the direction of displacement from the main body. Preferably, the ribs enclose an angle $\alpha$ from 10° to 40° therebetween.

As shown in FIG. 1, the extension 3 comprises a reinforcing plate 35 which preferably extends between the pair of ribs 33, 34.

Figure 2:
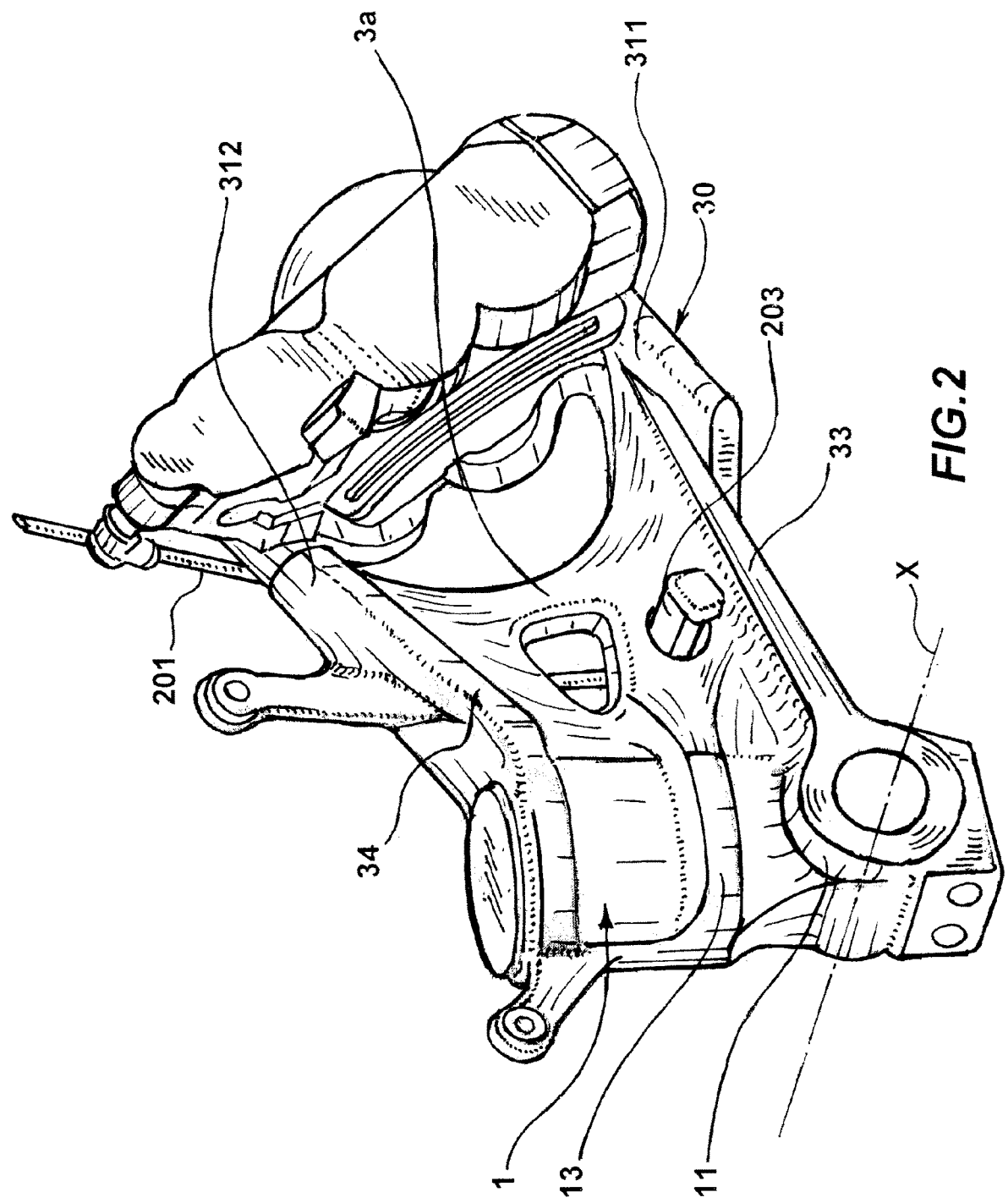
FIG. 2 is a perspective view from an inner side of the supporting structure of FIG. 1.

Also with reference now to FIG. 2, according to this configuration, the extension 3 is preferably provided with a substantially H-shaped section turned of 90°, in which the arms of the H-shape are defined by the ribs 33 and 34. More generally, to produce such a configuration, the ribs 33, 34 may have a projection along a direction parallel to the axis of rotation X of the wheel greater than that of said reinforcing plate 35. It should be noted that this approach advantageously allows to achieve the maximum rigidity in the direction parallel to the wheel axis.

According to a further aspect of the invention, the ribs 33, 34 forming the extension thickenings are, preferably, tapered in the direction away from the main body 1. In other words, the extension 3 is thicker at the ribs 33, 34, with respect to the reinforcing plate 35. This difference in thickening can be such that there is a maximum difference in proximity to the main body 1 and a minimum one at the opposite end of the extension 3, adjacent to the brake caliper 300.

The features described above however allows to optimally connect the main body 1 to the fastening device 30 of the brake caliper 300.

This is particularly advantageous in the case wherein the fastening device 30 to the brake caliper 300 comprises a pair of threaded members 311, 312, with each threaded member connected to a respective rib of said pair of ribs 33, 34, as indicated above.

It must also be noted that, according to a preferred embodiment, the main body 1 has a substantially cylindrical shaping, with the ribs 33, 34 joined to widened portions 11, 12 of the main body 1 itself. It is therefore apparent that such feature, together with the geometry of the ribs, makes it possible to limit the presence of accumulations of tension zones.

The configuration above described allows the extension 3 in general to confer robustness to the extension 3, while ensuring constructive simplicity and lightness.

It should also be noted that, in a preferred embodiment, the main body 10 may comprise a further expanded intermediate portion 13, always in favour of the structural features of the structure.

With reference now again to FIG. 1, a pass-through opening 31 is defined into the extension 3, for the housing of the sensor 200 of the phonic wheel.

In other words, when the supporting structure 100 is used in a motorbike including a brake assist system, the sensor 200 is placed inside the pass-through opening 31.

The pass-through opening 31 is defined within the reinforcing plate 35, in an intermediate position between the ribs 33, 34, thus not affecting the ribs 33 and 34.

Such arrangement therefore allows to obtain a high sensor protection, thanks to the presence of the lower rib 33 which allows to prevent any impacts affecting the structure of the sensor.

At the same time, the upper rib 34 ensures sufficient robustness to the structure as a whole.

Preferably, the pass-through opening 31 is formed in a position spaced from an edge 36 of the extension 3 connecting said two ribs 33, 34, to avoid that the presence of the opening 31 could excessively weaken the structure.

Again with reference to FIG. 2, according to one preferred embodiment, the sensor 200 includes a fastening portion 202 and an operating portion 203. Preferably, the fastening portion 202 has a greater extension with respect to said pass-through opening 201 and it is shaped to be arranged resting on the outer face 3b of the extension 3.

In one embodiment, the sensor 200 is shaped so that the operating portion 203 and the fastening portion 202 are positioned one on the inner face 3a and the other on the outer face 3b of the extension 3. This solution advantageously allows to simplify the assembly steps, while ensuring a high precision in the positioning of the sensor. For an easy positioning and simplicity in the sensor 100 assembling, an additional threaded hole can be provided on the extension 3 for securing the sensor through a corresponding screw.

According to a preferred embodiment, to facilitate the positioning of the cable 201, the supporting structure 100 comprises a grommet device 4, e.g. realized by means of a clamp, a sleeve or even a shaped recess, which is preferably fastened to the brake caliper 300.

This feature advantageously enables the guide 201 to be orientated in the direction of displacement of the supporting structure 100, thus preventing it from interfering with other components of the braking aid system.

In one embodiment, the grommet device 4 is fastened at an upper portion of the brake caliper 300, which for this purpose may comprise an auxiliary extension 301 formed at the upper part thereof. Preferably, the auxiliary extension 301 is integrally formed to the outer casing of the brake caliper 300.

According to a further aspect, the supporting structure 100 comprises a fastening arm 5 that allows the attachment of the fender of the motorbike.

Thanks to the characteristics of the invention, the supporting structure 100 allows a precise assembling of the phonic wheel sensor 200, at the same time ensuring a high protection of the same.

The invention claimed is:

1. A motorbike including an assistant system to a braking system, said assistant system comprising a phonic wheel, a phonic wheel speed sensor, and a related cable for transmission of a signal of said phonic wheel speed sensor, the motorbike comprising:
a supporting structure, for supporting the phonic wheel speed sensor and a brake caliper, the supporting structure comprising:
a main body fastened or is configured to be fastened to a stem of a fork of the motorbike;
a wheel support connected to said main body for supporting a wheel of said motorbike;
an extension which develops from said main body and said extension comprises a fastening device for said brake caliper, wherein said extension comprises a pair of ribs defining opposite edges thereof, a reinforcing plate extending between said pair of ribs, said pair of ribs forming thickenings of said extension with respect to said reinforcing plate, and a pass-through opening for housing said phonic wheel sensor and said pass-through opening being defined in said reinforcing plate in an intermediate position between said pair of ribs; and
a grommet device fastened to an upper portion of said brake caliper.

2. A motorbike according to claim 1, wherein said pair of ribs comprise a lower rib arranged, in use, towards a vehicle supporting surface, and an upper rib, opposite said lower rib.

3. A motorbike according to claim 1, wherein said main body, said wheel support and said extension are formed in an integral piece.

4. A motorbike according to claim 1, wherein said extension has a section substantially H-shaped turned of 90°, said pair of ribs forming arms of said section.

5. A motorbike according to claim 1, wherein said pair of ribs has, in use, an extension extending along a direction parallel to an axis of rotation of said motorbike wheel greater than that of said reinforcing plate.

6. A motorbike according to claim 1, wherein said pass-through opening is formed at a position spaced from an edge of said extension connecting said pair of ribs.

7. A motorbike according to claim 1, wherein said pair of ribs are tapered in a direction away from said main body.

8. A motorbike according to claim 1, wherein said main body has a substantially cylindrical shaping, said pair of ribs being connected to widened sections of said main body.

9. A motorbike according to according to claim 1, wherein said fastening device includes threaded members extending from said pair of ribs.

10. A motorbike according claim 1, wherein said pair of ribs diverge from each other in a direction away from said main body, said pair of ribs forming an angle in a range from 10° to 40° therebetween.

11. A motorbike according to claim 1, further comprising an auxiliary extension, said grommet device being fastened at said auxiliary extension, said auxiliary extension being formed at said upper portion of said brake caliper and said auxiliary extension being integrally connected to an outer casing of said brake caliper.

* * * * *